Nov. 27, 1928.
H. H. LAMPERT
1,693,240
FORM CLAMP
Filed April 12, 1928
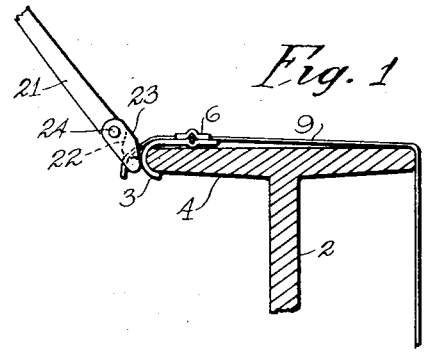
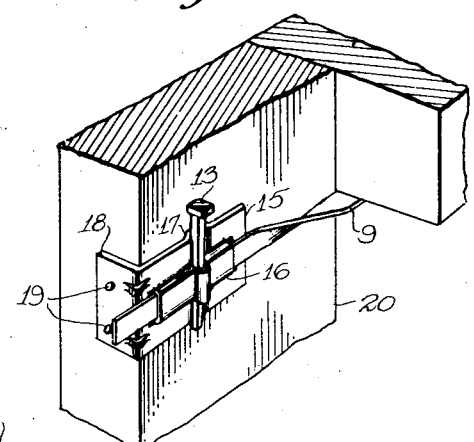
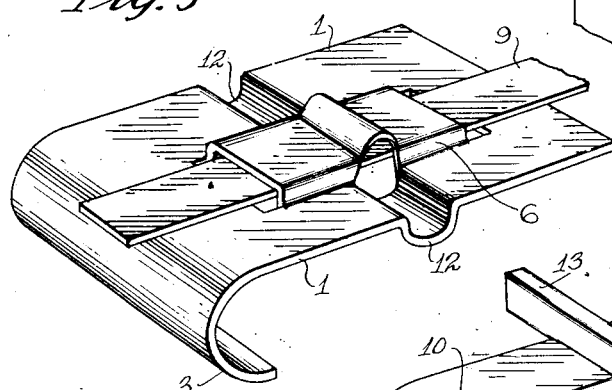
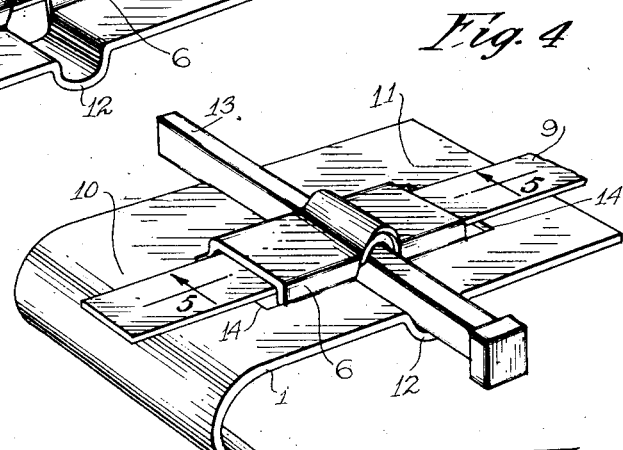
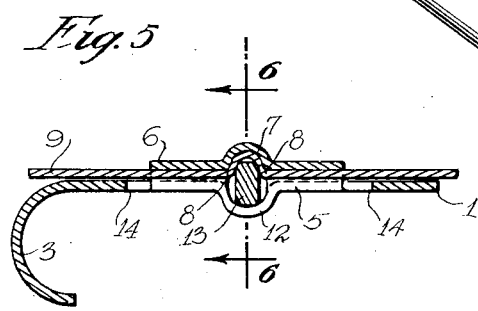
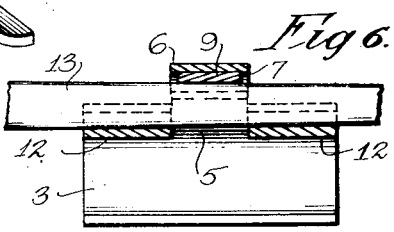

Patented Nov. 27, 1928.

1,693,240

UNITED STATES PATENT OFFICE.

HENRY H. LAMPERT, OF CHICAGO, ILLINOIS.

FORM CLAMP.

Application filed April 12, 1928. Serial No. 269,539.

The main objects of this invention are to provide an improved clamp particularly adapted for use as a form clamp in connection with concrete construction work; to provide a form clamp having an improved form of guideway for receiving a tie element; to provide an improved form of keyway for receiving a wedge to detachably secure the tie element to the clamp; and to provide a form clamp of this kind which may be readily stamped out of sheet metal.

Illustrative embodiments of this invention are shown in the accompanying drawing, wherein:

Figure 1 is a fragmentary section of a structural shape to which a tie element is secured by an improved clamp.

Fig. 2 is a perspective of part of a wall mold to which a tie element is secured by another type of the improved clamp.

Fig. 3 is a perspective of the clamp shown in Fig. 1 with part of a tie band extending therethrough and with the wedge removed.

Fig. 4 is a view similar to Fig. 3 but showing the tie band crimped by the wedge.

Fig. 5 is a section taken on the line 5—5 of Fig. 4.

Fig. 6 is a transverse section, taken on the line 6—6 of Fig. 5.

Clamps embodying this invention are adapted for use in connection with various types of molds. Fig. 1 shows one form of clamp applied to a structural shape employed in the construction of girders and beams. When the clamp is to be used in connection with floor molds or wall molds, the type shown in Fig. 2 may be used.

The improved clamp preferably comprises a sheet metal stamping formed to provide a guideway for a flexible tie element and a transversely disposed keyway for receiving a wedge which is adapted to kink the tie element.

In the construction shown in Figs. 1, 3, 4, 5 and 6, the improved clamp comprises a sheet metal plate 1 adapted to rest on top of an I-beam 2 and having one end thereof curled to provide a bearing 3 adapted to embrace one edge of the beam flange 4.

A portion of the plate 1 is struck out therefrom to provide a recess 5 and an overlying bridge portion 6. The central portion of the bridge 6 is further offset to provide a pocket or recess 7 and a pair of shoulders 8.

The bridge 6 is open at both ends to permit the insertion of a tie band 9 through the guideway formed by the bridge. Located on opposite ends of the bridge 6, is a pair of bearing portions 10 and 11 for supporting the band.

Located on opposite sides of the recess 5, adjacent the recess 7, is a pair of bearing parts 12 which are offset to form a keyway for a wedge 13 which is adapted to kink the tie band by forcing it into the recess 7 between the shoulders 8. In the specific forms herein shown, the offset portions 6 and 12 are located on respectively opposite sides of the plane of the plate 1.

The ends of the bridge portion 6 are bendable so that, under the action of a hammer or similar tool, they may be forced downwardly into the recess 5 to further kink the tie band in the event that is necessary.

The extremities of the bridge 6 are spaced from the shoulders 14 at the ends of the recess 5 so as to allow ample room for the bending of the tie band at these points.

The clamp shown in Fig. 2 comprises a plate 15 having a guideway 16 for the tie element 9 and a transverse keyway 17 for the wedge 13 which are similar in construction and arrangement to those shown in Figs. 3, 4, 5 and 6 and therefore need no further description.

One end of the plate 15 is bent at substantially right angles thereto to form a bearing flange 18 having apertures for receiving nails 19 whereby the clamp may be temporarily secured to a wall mold 20.

The tie element 9 is adjusted with respect to the clamp by a tool 21 comprising a shank which provides a handle and a head 22 on which is pivotally mounted a V-shaped locking jaw 23, which straddles the head 22 and which is pivotally secured thereto by a pin 24. The parts are arranged so that, when the jaw 23 is swung to an angular position relative to the handle, an opening is provided for receiving the tie element so as to permit the tool to grip the portion of the tie projecting beyond the clamp.

With the clamp shown in Fig. 1, the tool 21 is fulcrumed on the outer face of the bearing 3 and with the clamp shown in Fig. 2, it may be fulcrumed on the bearing 18.

In operation, the tie band is inserted through the guideway with one end thereof projecting sufficiently beyond the clamp to be gripped by the tool 21. The tool 21 is then applied to draw the tie band taut. After the band has been adjusted, the wedge 13 is driven into its keyway for kinking the band. If additional kinking of the band is necessary, the ends of the bridge portion may be bent inwardly by means of a hammer or similar tool.

Although several specific embodiments of this invention have been herein shown and described, it will be understood that details of the construction shown may be altered or omitted without departing from the spirit of this invention as defined by the following claims.

I claim:

1. A clamp comprising a support, a portion of said support forming a guideway for a tie element, said support having a recess adjacent said guideway, and a pair of bearing portions on respectively opposite sides of said recess forming a keyway for a wedge adapted to bend the tie element into said recess.

2. A clamp comprising a support, a portion of said support forming a guideway for a tie element, said support having a recess adjacent said guideway, and a pair of offset bearing portions on respectively opposite sides of said recess forming a keyway for a wedge adapted to bend the tie element into said recess.

3. A clamp comprising a sheet metal plate, a portion of said plate forming a guideway for a tie element, said plate having a recess therein, portions on opposite sides of said recess being offset from the plane of said plate to form a keyway.

4. A clamp comprising a sheet metal plate, a portion of said plate forming a guideway for a tie element, said plate having a recess therein, portions on opposite sides of said recess being offset from the plane of said plate to form a keyway, and a wedge in said keyway adapted to kink the tie element by forcing it into said recess.

5. A clamp comprising a sheet metal plate, a portion of said plate forming a guideway for a tie element, said plate having a pair of offset portions on respectively opposite sides of the plane of said plate, one of said offset portions providing a shoulder and the other of said offset portions forming a keyway for a wedge.

6. A clamp comprising a sheet metal plate, a portion of said plate forming a guideway for a tie element, a pair of offset portions on respectively opposite sides of the plane of said plate, one of said offset portions providing a shoulder and the other of said offset portions forming a keyway, and a wedge located in said keyway and adapted to kink the tie element by bending it into engagement with said shoulder.

7. A clamp comprising a sheet metal plate, a portion of said plate forming a guideway for a tie element, a pair of offset portions on respectively opposite sides of the plane of said plate, one of said offset portions providing a pair of spaced shoulders and the other of said offset portions providing a keyway, and a wedge in said keyway adapted to kink the tie element by bending it between said shoulders.

8. A clamp comprising a sheet metal plate, a portion of said plate forming a guideway for a tie element, a pair of offset portions extending transversely of each other, one of said offset portions providing a keyway, the other of said offset portions providing a guideway for a tie element, a shoulder on said other offset portion, and a wedge in said keyway adapted to kink the tie element by bending it against said shoulder.

9. A clamp comprising a supporting plate having a portion struck out therefrom to provide a recess and an overlying bridge portion, said plate and bridge portion defining a guideway for a tie element, and another portion struck out from said plate to define a keyway disposed transversely of said guideway, said guideway and keyway being located on respectively opposite sides of the plane of said plate.

Signed at Chicago this 9th day of April, 1928.

HENRY H. LAMPERT.